US006667362B2

(12) United States Patent
Robert et al.

(10) Patent No.: US 6,667,362 B2
(45) Date of Patent: Dec. 23, 2003

(54) VULCANIZABLE RUBBER COMPOSITION FOR THE MANUFACTURE OF A TIRE, AND A TIRE, THE TREAD OF WHICH COMPRISES SUCH A COMPOSITION

(75) Inventors: Pierre Robert, Perignat-les-Sarlieve (FR); Jean-Luc Cabioch, Chateaugay (FR); Jean-Michel Favrot, Cournon-d'Auvergne (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 175 days.

(21) Appl. No.: 09/742,480

(22) Filed: Dec. 20, 2000

(65) Prior Publication Data

US 2001/0034401 A1 Oct. 25, 2001

(30) Foreign Application Priority Data

Dec. 20, 1999 (FR) ............................................. 99 16104

(51) Int. Cl.$^7$ ........................... C08K 3/34; C08K 83/05
(52) U.S. Cl. ...................... 524/493; 524/506; 524/862; 152/209.1
(58) Field of Search ................... 524/506, 492, 524/493, 495, 496, 858, 862, 865, 188; 152/209.1

(56) References Cited

U.S. PATENT DOCUMENTS

| | | |
|---|---|---|
| 3,135,716 A | 6/1964 | Uraneck et al. |
| 3,244,664 A | 4/1966 | Zelinski et al. |
| 3,842,111 A | 10/1974 | Meyer-Simon et al. |
| 3,873,489 A | 3/1975 | Thurn et al. |
| 3,978,103 A | 8/1976 | Meyer-Simon et al. |
| 3,997,581 A | 12/1976 | Pletka et al. |
| 4,002,594 A | 1/1977 | Fetterman |
| 4,029,720 A | 6/1977 | Seiler et al. ............... 260/887 |
| 5,066,721 A | 11/1991 | Hamada et al. |
| 5,336,722 A | 8/1994 | Faul et al. .................. 525/113 |
| 5,527,170 A | 6/1996 | Graves et al. ............... 425/52 |
| 5,580,919 A | 12/1996 | Agostini et al. |
| 5,583,245 A | 12/1996 | Parker et al. |
| 5,684,171 A | 11/1997 | Wideman et al. |
| 5,684,172 A | 11/1997 | Wideman et al. |
| 5,696,197 A | 12/1997 | Smith et al. |
| 5,777,013 A | 7/1998 | Gardiner et al. ............ 524/274 |
| 5,811,479 A * | 9/1998 | Labauze ..................... 524/188 |
| 6,013,718 A | 1/2000 | Cabioch et al. |
| 6,071,995 A | 6/2000 | Labauze |

FOREIGN PATENT DOCUMENTS

| | | |
|---|---|---|
| EP | 0735088 | 10/1996 |
| EP | 0877047 | 11/1998 |
| FR | 2740778 | 7/1995 |
| WO | WO 96/37547 | 11/1996 |

OTHER PUBLICATIONS

U.S patent application Ser. No. 742,480, filed Dec. 2000, pending.

* cited by examiner

Primary Examiner—Robert Harlan
(74) Attorney, Agent, or Firm—Baker Botts L.L.P.

(57) ABSTRACT

The present invention relates to a vulcanizable rubber composition which can be used for the manufacture of tires, a process for the preparation of this composition and a tire, the tread of which comprises such a composition, the latter having improved hysteresis and physical properties in the vulcanized state, while retaining satisfactory processing properties.

A rubber composition according to the invention comprises a reinforcing white filler, and is such that it comprises at least one diene block polymer which is intended to interact with said reinforcing white filler and which comprises on at least one of its chain ends a polysiloxane block which ends in a trialkylsilyl group, said polysiloxane block corresponding to the formula:

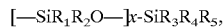

$[-SiR_1R_2O-]_x\text{-}SiR_3R_4R_5,$ in which $R_1$, $R_2$, $R_3$, $R_4$ and $R_5$ represent alkyl groups having from 1 to 20 carbon atoms, and in which x is a natural integer other than zero.

11 Claims, No Drawings

VULCANIZABLE RUBBER COMPOSITION FOR THE MANUFACTURE OF A TIRE, AND A TIRE, THE TREAD OF WHICH COMPRISES SUCH A COMPOSITION

BACKGROUND OF THE INVENTION

The present invention relates to a vulcanizable rubber composition which can be used for the manufacture of tires and a process for the preparation of this composition. The invention also provides a tire, the tread of which comprises such a composition. The rubber composition of the invention possesses improved hysteresis and physical properties in the vulcanized state, while retaining satisfactory processing properties in the non-vulcanized state.

Since fuel economies and the need to preserve the environment have become priorities, it has become desirable to produce rubber mixes having good mechanical properties and as low a hysteresis as possible so that they can be used in the form of rubber compositions usable for the manufacture of various semi-finished products involved in the constitution of tires, such as, for example, underlayers, sidewalls or treads, and in order to obtain tires having reduced rolling resistance.

To achieve such an objective, numerous solutions have been proposed, in particular those that modify the structure of diene polymers and copolymers at the end of polymerization by means of functionalizing, coupling or starring agents. The very great majority of these solutions have concentrated on the use of functionalized polymers which are active with respect to carbon black, with the aim of obtaining a good interaction between the polymer, thus modified, and the carbon black.

By way of illustration, the prior art relating to reinforcing fillers formed of carbon black, includes, for example, U.S. Pat. No. 3,135,716, which describes the reaction of living diene polymers at the end of a chain with a polyfunctional organic coupling agent in order to obtain polymers having improved properties. Mention may also be made of U.S. Pat. No. 3,244,664, which discloses the use of tetra-alkoxysilanes as coupling or starring agent for diene polymers.

Silica has long been used as a reinforcing filler in vulcanizable rubber compositions, in particular those intended for use in tire treads. However, this use has remained very limited, because of an unsatisfactory level of certain physical properties of such compositions, in particular abrasion resistance.

In order to overcome these drawbacks, the use functionalized diene polymers instead of the non-functionalized polymers which were used before has been proposed. In particular, polymers functionalized by alkoxysilane derivatives, such as tetra-ethoxysilanes, has been proposed. For example, U.S. Pat. No. 5,066,721 describes a rubber composition comprising a diene polymer functionalized by an alkoxysilane having at least one non-hydrolyzable alkoxyl radical, which makes it possible to eliminate the polymerization solvent by steam stripping.

One disadvantage of these functionalization reactions relates to the coupling reactions which accompany them, which generally makes it necessary to use an excess of alkoxysilane and/or intensive mixing, in order to minimize these coupling reactions.

Another drawback of these reactions involves the later implementation of the steam stripping operation, which is necessary to eliminate the polymerization solvent.

Generally, experience has shown that the functionalized polymers obtained in this fashion undergo changes in macrostructure during the stripping operation, which results in serious degradation of their properties, unless the functionalizing agent is an alkoxysilane belonging to a restricted family, such as that described in U.S. Pat. No. 5,066,721.

Consequently, the use of diene polymers comprising an alkoxysilane function to produce rubber compositions comprising silica as reinforcing filler has not proven satisfactory, despite the improved physical properties of these compositions.

This is why further research has been carried out on other functionalization reactions with the view to obtaining such rubber compositions.

For example, French patent specification FR-A-2 740 778 of the assignee of the present inventors discloses the use of diene polymers bearing a silanol function or a polysiloxane block having a silanol end at the chain end. For example, a cyclic polysiloxane functionalizing agent is used, such as hexamethylcyclotrisiloxane. The functionalized polymers obtained can be separated from the reaction medium resulting in their formation by steam extraction of the solvent, without their macrostructure and, consequently, their physical properties changing.

These functionalized polymers are intended to be incorporated in vulcanized compositions comprising silica as the majority reinforcing filler, including fillers comprising a blend of silica and carbon black. It has been possible to establish that these polymers impart rubber properties, in particular hysteresis and reinforcement properties in the vulcanized state, which are improved compared with those of control compositions based on non-functionalized diene polymers. Such compositions are at least analogous to those of compositions based on diene polymers comprising an alkoxysilane function.

However, this improvement of the hysteresis and reinforcement properties in the vulcanized state is accompanied by an increase in the Mooney viscosity of the compositions tested relative to control compositions, i.e., by a reduced ability to be worked in the non-vulcanized state.

SUMMARY OF THE INVENTION

The object of the present invention is to overcome the above-identified limitations of the prior art. The inventors have surprisingly discovered that a rubber composition comprising a reinforcing white filler and at least one diene block copolymer which is intended to interact with said reinforcing white filler, wherein said copolymer comprises on at least one end thereof a polysiloxane block ending in a trialkylsilyl group said polysiloxane block corresponding to the formula:

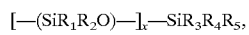

in which $R_1$, $R_2$, $R_3$, $R_4$ and $R_5$ each represent alkyl groups having from 1 to 20 carbon atoms and in which x is a natural integer other than zero, results in hysteresis properties at small and large deformations which are comparable to those achieved with the functionalized diene polymers mentioned above. In addition, the rubber composition results in processing properties in the non-vulcanized state which are particularly advantageous, because they are close to those obtained with a composition based on a non-functionalized diene polymer.

Preferably, the molecular weight of the polysiloxane block is between 500 and 5,000 g/mol.

The diene block copolymer of the invention is produced by reacting a diene polymer with a functionalized polysiloxane. It will be noted that this reaction can be performed continuously or discontinuously.

This diene block copolymer may be produced in two different ways:

(1) Reacting a living diene polymer with a polysiloxane block having an Si—Cl function at the chain end. More precisely, another polymer comprising said polysiloxane is grafted onto this living polymer, this other polymer being obtained anionically by means of an initiator comprising an alkyl group as carbanion. This method advantageously allows for the possibility of introducing into the reaction medium a reduced amount of a polar solvent.

(2) Carrying out sequential polymerization, wherein one or more diene monomers is/are polymerized to produce a living diene polymer block, the living diene polymer is then being reacted in a polar solvent with a cyclic siloxane which is polymerized anionically, to form a second block. At the end of the polymerization, the copolymer thus obtained is functionalized by a trialkylchlorosilane.

Published French patent specification FR-A-2 740 778 of the assignee of the present invention describes such sequential polymerization, wherein the first and second blocks are, for example, obtained respectively by copolymerization of butadiene and styrene, and by polymerization of hexamethylcyclotrisiloxane.

DETAILED DESCRIPTION OF THE INVENTION

In regard to the present invention, "diene polymer" is understood to mean any homopolymer obtained by polymerization of a conjugated diene monomer having 4 to 12 carbon atoms, or any copolymer obtained by copolymerization of one or more dienes conjugated together or with one or more vinyl aromatic compounds having 8 to 20 carbon atoms. Such copolymers contain 20% to 99% by weight of diene units and 1 to 80% by weight of vinyl aromatic units.

Suitable conjugated dienes include 1,3-butadiene, 2-methyl-1,3-butadiene, 2,3-di(C1 to C5 alkyl)-1,3-butadienes, such as 2,3-dimethyl-1,3-butadiene, 2,3-diethyl-1,3-butadiene, 2-methyl-3-ethyl-1,3-butadiene, 2-methyl-3-isopropyl-1,3-butadiene, and phenyl-1,3-butadiene, 1,3-pentadiene and 2,4-hexadiene.

Suitable vinyl aromatic compounds include, styrene, ortho-, para- or meta-methylstyrene, the commercial "vinyltoluene" mixture, para-tert.butylstyrene, the methoxystyrenes, vinyl mesitylene, divinyl benzene and vinyl naphthalene.

The following diene polymers/copolymers are preferred for the present invention:

polybutadienes, in particular those having a mass content of 1,2-units from 4% to 80%, polyisoprenes having a content of vinyl units of less than 80%, butadiene-styrene copolymers, in particular, those having a mass content of styrene from 4% to 50%, more particularly from 20% to 40%, and mass contents of 1,2-bonds and trans-1,4 bonds from 4% to 65% and 30% to 80% respectively, butadiene-isoprene copolymers, in particular those having a mass content of isoprene from 5% to 90% and a glass transition temperature (Tg) ranging from −80° C. to −20° C., isoprene-styrene copolymers, in particular those having a mass content of styrene from 5% to 50% and an amount of vinyl units which is less than 90%, butadiene-styrene-isoprene terpolymers, in particular those having a mass content of styrene from 5% to 50%, more particularly from 10% to 40%, a mass content of isoprene from 15% to 60%, more particularly from 20% to 50%, a mass content of butadiene from 5% to 50%, more particularly from 20% to 40%, a mass content of 1,2 units of the butadiene part from 4% to 85%, a mass content of trans-1,4 units of the butadiene part from 6% to 80%, a mass content of 1,2- and 3,4-units of the isoprene part from 5% to 70%, and a mass content of trans-1,4 units of the isoprene part from 10% to 50%.

Preferably, the diene polymer is obtained anionically, by means of a monofunctional or bifunctional initiator, depending on whether it is desired to obtain, for said block copolymer, a polysiloxane block ending in a trialkylsilyl group on only one or on both of the two chain ends, respectively. This initiator may be an alkyllithium, preferably n-butyllithium, or a lithium amide.

The functionalized polysiloxane bears a haloorganosilane function at the chain end and a trialkylsilyl function at the other end. It is obtained by first polymerizing a cyclic siloxane, which is initiated by an organometallic compound having a carbon-metal bond, preferably an organolithium compound, to form a polysiloxane and then functionalizing the polysiloxane by means of a dihaloorganosilane.

Preferably, hexamethylcyclotrisiloxane is used as the cyclic siloxane, n-butyllithium is used as initiator and dichlorodimethylsilane is used as the functionalizing agent to produce the functionalized polysiloxane. Thus, each polysiloxane block would be a polydimethylsiloxane (abbreviated to PDMS in the rest of the present description), which ends in a trialkylsilyl group.

Alternatively, the functionalized polysiloxane may be prepared using sec.-butyllithium, n-propyllithium or ethyllithium as initiator, in order to obtain a polysiloxane, the end trialkylsilyl group of which comprises a sec.-butyl, n-propyl or ethyl radical, respectively.

A rubber composition according to the invention is obtained by mixing, by means of thermomechanical working, said diene block copolymer comprising at least one polysiloxane block which ends in a trialkylsilyl group with a reinforcing white filler present in a majority portion in the reinforcing filler used and with additives suitable for obtaining a vulcanizable rubber composition.

According to variant embodiments of the composition according to the invention, said diene block copolymer may be used in a blend with one or more other elastomers conventionally used in tires, such as natural rubber or a blend based on natural rubber and a synthetic elastomer, or alternatively another diene elastomer which may be coupled and/or starred, or alternatively partially or completely functionalized by a block other than a polysiloxane block which ends in a trialkylsilyl group.

However, the improvement in the properties of the rubber composition according to the invention are greater, when a lower proportion of such conventional elastomers are used. Advantageously, such conventional elastomers may be present in a quantity of from 1 to 70 parts by weight per 100 parts by weight of the diene block copolymer comprising at least one polysiloxane block ending in a trialkylsilyl group according to the invention.

"Reinforcing white filler" is understood herein to mean a "white" filler (i.e. an inorganic filler, particularly a mineral filler), sometimes also called "clear" filler, which is capable, on its own, without any means other than an intermediate coupling system, of reinforcing a rubber composition intended for the manufacture of tires. In other words the reinforcing white filler is capable of replacing a conventional filler of tire-grade carbon black in its reinforcement function.

Preferably, the reinforcing white filler is, in its entirety or at least in a majority portion, silica ($SiO_2$). The silica used may be any reinforcing silica known to those skilled in the art, in particular any precipitated or pyrogenic silica having a BET surface area and a specific CTAB surface area both of which are less than 450 $m^2/g$. The highly dispersible precipitated silicas are preferred.

In the present specification, the BET specific surface area is determined in known manner, in accordance with the method of Brunauer, Emmet and Teller described in "The Journal of the American Chemical Society", vol. 60, page 309, February 1938, and corresponding to Standard AFNOR-NFT-45007 (November 1987); the CTAB specific surface area is the external surface area determined in accordance with the same Standard AFNOR-NFT-45007 of November 1987.

"Highly dispersible silica" is understood to mean any silica having a very substantial ability to disagglomerate and to disperse in an elastomeric matrix, which can be observed in known manner by electron or optical microscopy on thin sections. Non-limiting examples of such preferred highly dispersible silicas include the silica Perkasil KS 430 from Akzo, the silica BV 3380 from Degussa, the silicas Zeosil 1165 MP and 1115 MP from Rhodia, the silica Hi-Sil 2000 from PPG, the silicas Zeopol 8741 or 8745 from Huber, and treated precipitated silicas, such as the aluminium-"doped" silicas described in application EP-A-0 735 088.

The physical state in which the reinforcing white filler is present is immaterial; thus it may be in the form of a powder, microbeads, granules or balls. "Reinforcing white filler" is also understood to mean mixtures of different reinforcing white fillers, in particular, mixtures of highly dispersible silicas such as described above.

According to a preferred example of embodiment of the invention, the reinforcing filler of the rubber composition comprises a majority of reinforcing white filler (i.e., the mass fraction of reinforcing white filler in the entire reinforcing filler of the rubber composition is greater than 50%).

The reinforcing filler also may be a blend (mixture) of fillers, comprising the above-mentioned reinforcing white filler(s) and carbon black in a minority proportion (i.e., in a mass fraction of less than 50% of the total amount of reinforcing filler). Suitable carbon blacks are all the carbon blacks, in particular the blacks of the type HAF, ISAF and SAF, which are conventionally used in tires, and particularly in treads for tires. Non-limiting examples of such blacks, include the blacks N115, N134, N234, N339, N34 7 and N375.

For example, black/silica blends or blacks partially or integrally covered with silica are suitable to form the reinforcing filler. Also suitable are carbon blacks modified by silica, including, inter alia, the fillers sold by CABOT under the name "CRX 2000", which are described in WO-A-96/37547.

Where the reinforcing filler contains only a reinforcing white filler and carbon black, the mass fraction of the carbon black in said reinforcing filler is preferably selected to be less than or equal to 30% of the amount of reinforcing filler.

However, experience has shown that the aforementioned properties of the composition according to the invention are most greatly involved, the higher the mass fraction of reinforcing white filler that is used in the reinforcing filler in the rubber composition. Said properties are optimum when said rubber composition contains solely a reinforcing white filler, for example silica, as reinforcing filler. The latter, therefore, constitutes a preferred example of a rubber composition according to the invention.

The rubber composition according to the invention furthermore comprises, in conventional manner, a reinforcing white filler/elastomeric matrix bonding agent (also referred to as coupling agent), the function of which is to ensure sufficient chemical and/or physical bonding (or coupling), between the white reinforcing filler and the elastomeric matrix, while facilitating the dispersion of the white filler within said matrix.

Such a bonding agent, which is at least bifunctional, has, for example, the simplified general formula "Y—T—X", in which:

Y represents a functional group ("Y" function) which is capable of bonding physically and/or chemically with the white filler, such a bond being able to be established, for example, between a silicon atom of the coupling agent and the hydroxyl (OH) surface groups of the filler (for example, surface silanols in the case of silica);

X represents a functional group ("X" function) which is capable of bonding physically and/or chemically with the elastomer, for example by means of a sulphur atom; and T represents a hydrocarbon group that links Y and X.

These bonding agents are not to be confused with simple agents for covering the filler in question which, in known manner, may comprise the Y function which is active with respect to the filler but are devoid of the X function which is active with respect to the elastomer.

Such bonding agents, of variable effectiveness, have been described in a large number of documents and are well-known to those skilled in the art. In fact, any known bonding agent may be used to ensure effective bonding between the silica and diene elastomer in diene rubber compositions which can be used for the manufacture of tires. Such bonding agents include organosilanes, in particular polysulphurized alkoxysilane or mercaptosilanes, or polyorganosiloxanes bearing the X and Y functions mentioned above.

In particular, polysulphurized alkoxysilanes are used, such as those described in U.S. Pat. Nos. 3,842,111, 3,873,489, 3,978,103, 3,997,581, 4,002,594, 5,580,919, 5,583,245, 5,663,396, 5,684,171, 5,684,172 and 5,696,197.

Particularly suitable bonding agents for the rubber composition of the invention, without the definition below being limiting, are so-called "symmetrical" polysulphurized alkoxysilanes which satisfy the following general formula (I):

$$Z-A-S_n-A-Z, \qquad (I)$$

in which:

n is an integer from 2 to 8;

A is a divalent hydrocarbon radical;

Z corresponds to one of the following formulae:

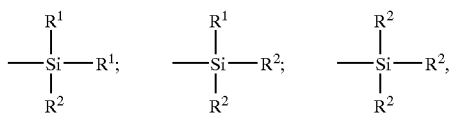

in which:
R$^1$, which may or may not be substituted, and may be identical or different, each represents a C$_1$–C$_{18}$ alkyl group, a C$_5$–C$_{18}$ cycloalkyl group, or a C$_6$–C$_{18}$ aryl group;
R$^2$, which may or may not be substituted, and may be identical or different, each represents a C$_1$–C$_{18}$ alkoxyl group or a C$_5$–C$_{18}$ cycloalkoxyl group.

In formula (I) the number n is preferably an integer from 3 to 5.

In the case of a mixture of polysulphurized alkoxysilanes in accordance with Formula (I) particularly conventional, commercially available, mixes, the average value of "n" is a fractional number, preferably between 3 and 5, more preferably close to 4.

Radical A, whether substituted or not, is preferably a divalent, saturated or non-saturated hydrocarbon radical, comprising 1 to 18 carbon atoms. In particular A comprises a C$_1$–C$_{18}$ alkylene group or C$_6$–C$_{12}$ arylene group, more particularly a C$_1$–C$_{10}$ alkylene, in particular a C$_2$–C$_4$ alkylene, preferably propylene.

The R radicals are preferably a C$_1$–C$_6$ alkyl, a cyclohexyl or a phenyl, in particular a C$_1$–C$_4$ alkyl group, more particularly methyl and/or ethyl.

The R$_1$ radicals are preferably a C$_1$–C$_8$ alkoxyl or a C$_5$–C$_8$ cycloalkoxyl, more particularly methoxyl and/or ethoxyl.

Such so-called "symmetrical" polysulphurized alkoxysilanes, and processes for obtaining them are described, for example, in U.S. Pat. Nos. 5,684,171 and 5,684,172, which give a detailed list of these known compounds, for n varying from 2 to 8.

Preferably, the polysulphurized alkoxysilane used in the invention is a polysulphide, in particular a tetrasulphide, of bis(alkoxy(C$_1$–C$_4$)silylpropyl), more preferably of bis(trialkoxy(C$_1$–C$_4$)silylpropyl), in particular of bis(3-triethoxysilylpropyl) or of bis(3-trimethoxysilylpropyl).

A particularly preferred bonding agent for use in the present invention is bis(triethoxysilylpropyl) tetrasulphide, or TESPT, of the formula [(C$_2$H$_5$O)$_3$Si(CH$_2$)$_3$S$_2$]$_2$, which is sold by Degussa under the name Si69 (or X50S when it is supported to 50% by weight on carbon black), or by Witco under the name Silquest A1289. In both cases, the bonding agent is a commercial mixture of polysulphides having an average value of n which is close to 4.

Those skilled in the art will be able to adjust the content of bonding agent in the compositions of the invention, according to the intended application, the elastomeric matrix used and the quantity of reinforcing white filler used.

In the rubber compositions according to the invention, the content of bonding agent may be within a range from 0.5 to 15% relative to the mass of reinforcing white filler, preferably, within a range from 5 to 10%.

The bonding agent may be grafted beforehand (via the "X" function) onto the diene elastomer of the composition of the invention, the elastomer thus functionalized or "precoupled" thereby comprising the free "Y" function for the reinforcing white filler. It could also be grafted beforehand (via the "Y" function) onto the reinforcing white filler, the thus "precoupled" filler then being able to be bonded to the diene elastomer by means of the free "X" function.

It is preferred, however, for reasons of better processing of the compositions in the non-vulcanized state, to use the bonding agent, either grafted onto the reinforcing white filler, or in the free (i.e. non-grafted) state.

Additional additives which are used in this composition, include plasticizers, pigments, antioxidants, antiozone waxes, a vulcanization system based either on sulphur and/or on peroxide and/or on bismaleimides, vulcanization accelerators, extender oils, one or more agents for covering the silica, such as alkoxysilanes, polyols or amines.

A further subject of the invention is a tread for a tire, which comprises a rubber composition according to the invention.

Because of the reduced hysteresis which characterizes the rubber composition according to the invention in the vulcanized state, it will be noted that a tire, the tread of which comprises said composition has an advantageously reduced rolling resistance.

The aforementioned characteristics of the present invention, as well as others, will be better understood on reading the following description of several examples of embodiment of the invention, which are given by way of illustration and not of limitation.

In the examples which follow, the viscosities are inherent viscosities which are measured in toluene, at a concentration of 1 g/l.

I. EXAMPLES OF PREPARATION OF POLYMERS ACCORDING TO THE INVENTION

Example I.1

Preparation of a copolymer having two blocks, SBR and PDMS, ending in a trialkylsilyl group, the PDMS block having a molecular weight of 1,200 g/mol, with this copolymer corresponding to the formula:

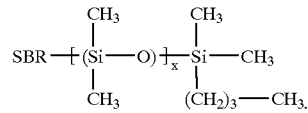

Synthesis of a functionalized PDMS comprising an [Si(CH$_3$)$_2$Cl] function:
  20 ml toluene and 0.045 mol hexamethylcyclotrisiloxane are injected into a bottle provided with a seal and a capsule having three holes. 0.008 moles butyllithium is added (0.4 mol/l solution in cyclohexane). The solution is stirred for one hour at 70° C. Then 50 ml of THF which has previously been distilled over sodium/benzophenone are added. After stirring for 75 minutes at 60° C., 0.0088 mol of dichlorodimethylsilane is added. The polymer thus obtained may be stored for several days under a nitrogen atmosphere. Its molecular weight, determined by the SEC (size exclusion chromatography) technique, is 1,200 g/mol.

Preparation of the copolymer having two blocks:
  231 g styrene, 410 g butadiene and 1150 ppm THF are injected into a 10 l reactor containing 5.8 l of deaerated toluene. After neutralizing the impurities using n-butyllithium, 0.0032 mol of active n-butyllithium is added. The polymerization is carried out at 40° C.

When the conversion reaches 75% (viscosity of 1.40 dl/g), the solution of PDM[S-[Si(Me)$_2$Cl] prepared as above is injected into the reactor. The solution is stirred for 15 min at 40° C. The polymerization is stopped and the copolymer obtained is treated with an antioxidant by adding 0.8 parts per hundred parts copolymer (phr) of 2,2'-methylene-bis-(4-methyl-6-tert.butylphenol) and 0.2 phr N-(1,3-dimethylbutyl)-N'-phenyl-p-phenylene diamine, respectively.

The copolymer is recovered by a conventional steam stripping operation for the solvent. It is then dried on a tool at 100° C. for 10 min.

The inherent viscosity of the copolymer (in toluene) after stripping and drying is 1.53 dl/g and the Mooney viscosity ML (1+4, 100° C.) is 36.

Analysis of the copolymer by near infrared shows that the SBR contains 27% by weight of styrene. The butadiene fraction contains 40% vinyl units.

The percentage of coupled chains (by weight), determined by size-exclusion chromatography (SEC technique), is 10%.

The mass of the copolymer, determined by osmometry, is 170,000 g/mol.

$^1$H NMR analysis of the copolymer having two blocks is carried out on a sample which has undergone three series of treatments, each consisting of coagulation in a blend of THF/methanol (50%—50%) following by redissolving in toluene. An apparatus sold under the name "BRUKER AC200" was used for this $^1$H NMR analysis.

The $^1$H NMR spectrum of this copolymer is characterized by a block between −0.1 and 0.1 ppm. By determining for this copolymer the amount of —[Si(CH$_3$)$_2$O]— units which correspond to this block, and by taking into account the number molecular weight (Mn) of the PDMS block (1,200 g/mol) which is evaluated by the SEC technique, the amount of copolymer comprising a PDMS block was determined to be 70%.

Example I.2

Preparation of a copolymer having two blocks, SBR and PDMS, ending in a trialkylsilyl group, the PDMS block having a molecular weight of 4,500 g/mol, with this copolymer corresponding to the formula:

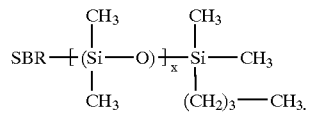

The PDMS block is prepared under the same conditions described in Example 1.1, but with the exception of the quantity of n-butyllithium used, which here is 0.002 mol.

The copolymer having two blocks, SBR-PDMS, is prepared under conditions identical to those described in Example I.1.

The inherent viscosity of the copolymer (in toluene), after stripping and drying, is 1.59 dl/g.

The number-average molecular weight of the copolymer, determined by osmometry, is 175,000 g/mol.

Using the $^1$H NMR analysis method and the corresponding apparatus described in Example 1.1 above, an amount of copolymer comprising a PDMS block, which is about 70%, was determined.

II. EXAMPLES OF RUBBER COMPOSITIONS ACCORDING TO THE INVENTION

In the following examples, the properties of the compositions of the invention are evaluated as follows:

Mooney viscosity ML (1+4) at 100° C.: measured in accordance with Standard ASTM: D-1646,
moduli of elongation at 300% (ME 300), 100% (ME 100) and at 10% (ME 10): measurements made in accordance with Standard ISO 37,
hysteresis losses (HL): measured by rebound at 60° C. in %. The deformation for the losses measured is 35%,
SHORE A hardness: measurements made in accordance with Standard DIN 53505,
dynamic shear properties: measurements according to the deformation, performed at 10 Hertz with a peak-to-peak deformation from 0.15% to 50%. The non-linearity expressed is the difference in the shear modulus between 0.15% and 50% deformation, in MPa. The hysteresis is expressed by the measurement of tan delta at 7% deformation and at 23° C. in accordance with Standard ASTM D2231-71 (reapproved in 1977).

Example II.1

In this example, the contributions of four elastomers "SBR A, SBR B, SBR C and SBR D" respectively were studied within rubber compositions A, B, C and D, of the type for a tread for a passenger-car tire and with only silica as reinforcing filler.

These four elastomers have the following characteristics:

SBR A is a control SBR which was synthesized in accordance with Example I.1 according to the invention, with the exception that the polymerization reaction, was stopped by the use of methanol;

SBR B is an SBR which has a dimethylsilanol function, which is obtained by addition of hexamethylcyclotrisiloxane when the rate of conversion of the monomers reaches 70% (reference may be made to French patent specification FR-A-2 740 778 for a description of this functionalization);

SBR C is an SBR according to the invention, the synthesis of which was described in Example I.1, and SBR D is an SBR which was obtained by anionic polymerization of hexamethylcyclotrisiloxane, following copolymerization of the styrene and butadiene (see the patent specification FR-A-2 740 778, page 15). This SBR D comprises a PDMS block which ends in a dimethylsilanol function, the PDMS block having a molar mass of 4,500 g/mol.

The formulation used for each of these four rubber compositions A, B, C and ]E) is as follows (all the parts are expressed by weight):

| Elastomer | 100 |
|---|---|
| Silica (1) | 80 |
| Aromatic oil (2) | 40 |
| Bonding agent (3) | 6.4 |
| ZnO | 2.5 |
| Stearic acid | 1.5 |
| Antioxidant (4) | 1.9 |
| Antiozone wax (5) | 1.5 |
| Sulphur | 1.1 |
| Sulphenamide (6) | 2 |
| Diphenylguanidine with | 1.5 |

(1) = silica Zeosil 1165 by Rhône-Poulenc;
(2) = oil sold under the name Enerflex 65,
(3) = bonding agent Si69 Degussa,
(4) = N-(1,3-dimethyl butyl)-n-N'-phenyl-p-phenylenediamine
(5) wax C32ST
(6) N-cyclohexyl-2-benzothiazylsulphenamide Each rubber composition A, B, C, D is prepared in accordance with the method described in European patent specification EP-A-501 227, which provides that thermo-mechanical working is carried out in two stages which last for 5 min and 4 min respectively, at an average blade speed of 45 rpm, until an identical maximum dropping temperature of 160° C. is reached, with incorporation of the vulcanizing system being carried out on the "homo-finisher" at 30° C.

Vulcanization is carried out at 150° C. for 40 min.

The results are set forth in Table 1.

TABLE 1

|  | COMPOSITION | | | |
|---|---|---|---|---|
|  | A | B | C | D |
| Properties of the SBR elastomer | | | | |
| ML (1 + 4) at 100° C. | 30 | 32 | 36 | 38 |
| Properties in the non-vulcanized state | | | | |
| ML (1 + 4) at 100° C. | 50 | 84 | 62 | 67 |
| Properties in the vulcanized state | | | | |
| Shore | 62.8 | 58.7 | 59.2 | 59.5 |
| ME 10 | 4.68 | 3.63 | 3.95 | 3.68 |
| ME 100 | 1.77 | 1.75 | 1.59 | 1.94 |
| ME 300 | 2.15 | 2.47 | 2.14 | 2.71 |
| ME 300/ME 100 | 1.21 | 1.41 | 1.35 | 1.40 |
| Losses HL (60° C., def 35%) | 30.6 | 19.2 | 26.4 | 20.3 |
| Dynamic properties as a function of deformation | | | | |
| Delta G*23° C. | 2.51 | 0.97 | 1.53 | 1.05 |
| $\tan_{max}$ 23° C. | 0.302 | 0.210 | 0.255 | 0.211 |

It is deduced from these results that in a silica mix and relating to the properties in the vulcanized state, SBR C according to the invention imparts to rubber composition C reinforcement properties which are superior to those obtained with the control SBR A. The same applies to SBR B and SBR D, relative to said SBR A.

Furthermore, it will be noted that the hysteresis properties at low and high deformations of rubber composition C according to the invention are significantly improved compared with those of the control rubber composition A and are close to those of rubber compositions B and D.

As far as the non-vulcanized state is concerned, it will be noted that rubber composition C of the invention has a Mooney viscosity which is lower than those of rubber compositions B and D, and which is close to that of the control rubber composition A.

Consequently, rubber composition C of the invention has a processing ability which is improved compared with those of rubber compositions B and D having conventional functionalized elastomers, and which is substantially of the same order as that of rubber composition A having a non-functionalized elastomer.

In other words, the incorporation in a rubber composition of an elastomer according to Example I.1 of the invention, such as SBR C, makes it possible to obtain for this composition rubber properties which are significantly improved compared with those of a rubber composition having a non-functionalized elastomer, such as SBR A, while having a similar processing ability with respect to this latter rubber composition.

Example II.2

In this example, the contributions of three of the four aforementioned elastomers SBR A, SBR B, SBR C and of a second elastomer according to the invention SBR E, in rubber compositions A, B, C and E respectively, still of the type for a tread for a passenger-car tire and with only silica as reinforcing filler, were studied.

The second elastomer SBR E according to the invention was synthesized as described in Example I.2.

For each rubber composition A, B, C, E, the formulation, the mixing and the vulcanization are the same as in Example II.1.

The results are set forth in Table 2 below.

TABLE 2

|  | COMPOSITION | | | |
|---|---|---|---|---|
|  | A | B | C | E |
| Properties of the SBR elastomer | | | | |
| ML (1 + 4) at 100° C. | 30 | 32 | 36 | 29 |
| Properties in the non-vulcanized state | | | | |
| ML (1 + 4) at 100° C. | 50 | 84 | 62 | 61 |
| Properties in the vulcanized state | | | | |
| Shore | 62.8 | 58.7 | 59.2 | 60.7 |
| ME 10 | 4.68 | 3.63 | 3.95 | 4.21 |
| ME 100 | 1.77 | 1.75 | 1.59 | 1.62 |
| ME 300 | 2.15 | 2.47 | 2.14 | 2.05 |
| ME 300/ME 100 | 1.21 | 1.41 | 1.35 | 1.27 |
| Losses HL (60° C., def 35%) | 30.6 | 19.2 | 26.4 | 30.4 |
| Dynamic properties as a function of deformation | | | | |
| Delta G*23° C. | 2.51 | 0.97 | 1.53 | 1.80 |
| $\tan_{max}$ 23° C. | 0.302 | 0.210 | 0.255 | 0.259 |

It is deduced from these results that in a silica mix, relating to the properties in the vulcanized state, SBR C according to the invention imparts to the corresponding rubber composition C reinforcement properties which are superior to those obtained with the control SBR A and with the other SBR E according to the invention. The same applies to rubber composition B comprising SBR B and with respect to rubber composition A based on control SBR A.

Furthermore, it will be noted, that the hysteresis properties at low and high deformations of rubber composition C according to the invention are improved relative to those of the control rubber composition A and of the other rubber composition E according to the invention. Moreover, said hysteresis properties are improved for rubber composition E according to the invention relative to the control rubber composition A.

As far as the non-vulcanized state is concerned, it will be noted that the rubber compositions C and E of the invention have Mooney viscosities which are lower than those of rubber composition B having a conventional functionalized elastomer and are close to that of the control rubber composition A.

Consequently, rubber compositions C and E of the invention have a processing ability which is improved compared with that of rubber composition B comprising a conventional functionalized elastomer and is substantially of the same order as that of rubber composition A having a non-functionalized elastomer.

In other words, incorporating an SBR C elastomer according to Example I.1 of the invention in rubber composition C makes it possible to obtain for composition C rubber properties which are significantly improved relative to those, on one hand, of rubber composition A comprising non-functionalized elastomer and, on the other hand, the rubber composition E according to Example I.2 of the invention, while having a similar processing ability with respect to said rubber composition A.

Example II.3

In this example, the contributions of three of the four aforementioned elastomers SBR A, SBR B, SBR C and of a third elastomer according to the invention SBR F, within rubber compositions A, B, C and F respectively, all of the type for a tread for a passenger-car tire and with only silica as reinforcing filler, were studied.

The third elastomer SBR F according to the invention comprises a blend of the elastomer SBR A and a PDMS polymer of a molecular weight equal to 4,200 g/mol, the PDMS block being prepared in accordance with Example I.1, with the difference that methanol is added instead of the dichlorodimethylsilane at the end of polymerization. This PDMS block corresponds to the following formula:

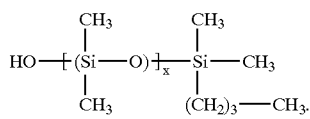

For each rubber composition A, B, C, the formulation, the mixing and the vulcanization are the same as in Example II.1. For rubber composition F, 100 parts of elastomer are subdivided into 97 parts of elastomer A and 3 parts of the PDMS described above, which are introduced into the internal mixer at the same time.

The results are set forth in Table 3 below.

TABLE 3

|  | COMPOSITION | | | |
| --- | --- | --- | --- | --- |
|  | A | B | C | F |
| Properties of the SBR elastomer | | | | |
| ML (1 + 4) at 100° C. | 30 | 32 | 36 | 30 |
| Properties in the non-vulcanized state | | | | |
| ML (1 + 4) at 100° C. | 50 | 84 | 62 | 33 |
| Properties in the vulcanized state | | | | |
| Shore | 62.8 | 58.7 | 59.2 | 70.6 |
| ME 10 | 4.68 | 3.63 | 3.95 | 7.16 |
| ME 100 | 1.77 | 1.75 | 1.59 | 2.50 |
| ME 300 | 2.15 | 2.47 | 2.14 | 2.63 |
| ME 300/ME 100 | 1.21 | 1.41 | 1.35 | 1.05 |
| Losses HL (60° C., def 35%) | 30.6 | 19.2 | 26.4 | 30.7 |
| Dynamic properties as a function of deformation | | | | |
| Delta G*23° C. | 2.51 | 0.97 | 1.53 | 6.00 |
| tan$_{max}$23° C. | 0.302 | 0.210 | 0.255 | 0.377 |

It is deduced from these results that in a silica mix, relating to the properties in the vulcanized state, SBR C according to the invention and SBR B impart to the corresponding rubber compositions B and C reinforcement properties which are superior to those obtained with the control SBR A and the SBR F comprising the aforementioned blend. It will be noted in particular that this SBR F provides reduced reinforcement for the corresponding rubber composition F.

Furthermore, it will be noted that the hysteresis properties at low and high deformations of rubber composition B and of rubber composition C according to the invention are improved compared with those of the control rubber composition A and rubber composition F. The hysteresis of the latter in fact appears to be particularly high.

In other words, it would appear that incorporating said elastomer SBR C according to the invention in rubber composition C makes it possible to obtain for this composition C rubber properties which are close to those of rubber composition B comprising a conventional functionalized elastomer, while having a similar processing ability with respect to rubber composition A comprising a non-functionalized elastomer. It will be noted that the direct addition of a PDMS polymer, the trialkylsilyl end group of which comprises a butyl radical, does not make it possible to obtain such a result.

We claim:

1. A vulcanizable rubber composition comprising a reinforcing white filler, which can be used for the manufacture of a tire, wherein the rubber composition comprises a diene block copolymer which is intended to interact with said reinforcing white filler, said diene block copolymer comprising on at least one end thereof a polysiloxane block which ends in a trialkylsilyl group, said polysiloxane block corresponding to the formula:

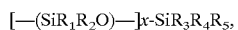

in which $R_1$, $R_2$, $R_3$, $R_4$ and $R_5$ each represent alkyl groups having from 1 to 20 carbon atoms, and in which x is a natural integer other than zero.

2. A rubber composition according to claim 1, wherein said diene block copolymer comprises styrene-butadiene units.

3. A rubber composition according to claim 1, wherein said polysiloxane block comprises a polydimethylsiloxane.

4. A rubber composition according to claim 1, wherein said trialkylsilyl group comprises a butyl group.

5. A rubber composition according to claim 1, wherein said polysiloxane block has a molecular weight of between 500 and 5,000 g/mol.

6. A rubber composition according to claim 1, wherein said reinforcing white filler comprises greater than 50% of the mass fraction of reinforcing filler in the rubber composition.

7. A rubber composition according to claim 6, wherein said reinforcing white filler further comprises carbon black in an amount of less than or equal to 30% of the mass fraction of said reinforcing filler.

8. A rubber composition according to claim 1, wherein said reinforcing white filler comprises silica.

9. A rubber composition according to claim 1, wherein the composition comprises a blend of natural rubber and said diene block copolymer, wherein the natural rubber comprises from 1 to 70 parts by weight per 100 parts by weight of said diene block copolymer.

10. A rubber composition according to claim 1, wherein the composition comprises a blend of a synthetic elastomer and/or a starred diene elastomer and diene block copolymer, wherein said synthetic elastomer and/or starred diene elastomer comprises from 1 to 70 parts by weight per 100 parts by weight of said diene block copolymer.

11. A tire, characterized in that it comprises a tread containing a rubber composition according to one of claims 1 to 10.

* * * * *